US006856454B2

(12) United States Patent
Pavel et al.

(10) Patent No.: US 6,856,454 B2
(45) Date of Patent: Feb. 15, 2005

(54) DYNAMIC OPTICAL SPECTRAL CONTROL SCHEME FOR OPTICAL AMPLIFIER SITES

(75) Inventors: Lacra Pavel, Ottawa (CA); Andrew Robinson, Ottawa (CA)

(73) Assignee: PTS Corporation, San Jose, CA (US)

( * ) Notice: Subject to any disclaimer, the term of this patent is extended or adjusted under 35 U.S.C. 154(b) by 0 days.

(21) Appl. No.: 10/601,183

(22) Filed: Jun. 20, 2003

(65) Prior Publication Data

US 2004/0095636 A1 May 20, 2004

Related U.S. Application Data

(63) Continuation of application No. 09/970,930, filed on Oct. 4, 2001, now abandoned.

(51) Int. Cl.[7] ................................................. H01S 3/00
(52) U.S. Cl. ..................................... 359/337; 359/337.1
(58) Field of Search ............................... 359/337.1, 337

(56) References Cited

U.S. PATENT DOCUMENTS

| | | | |
|---|---|---|---|
| 5,374,973 A | 12/1994 | Maxham et al. | |
| 5,852,510 A | 12/1998 | Meli et al. | |
| 5,907,429 A | 5/1999 | Sugata | |
| 5,995,274 A | 11/1999 | Sugaya et al. | |
| 6,038,063 A | 3/2000 | Tsuda et al. | |
| 6,078,422 A | 6/2000 | Kosaka et al. | |
| 6,091,539 A | 7/2000 | Kosaka | |
| 6,307,670 B1 | 10/2001 | McNamara | |
| 6,313,940 B1 | 11/2001 | Bode et al. | |
| 6,344,914 B1 | 2/2002 | Shimojoh et al. | |
| 6,359,726 B1 | 3/2002 | Onaka et al. | |
| 6,411,417 B1 | 6/2002 | Roberts et al. | |
| 6,421,167 B1 | 7/2002 | Cohen et al. | |
| 2001/0043389 A1 | 11/2001 | Bonnedal et al. | |
| 2001/0046083 A1 | 11/2001 | Akasaka et al. | |
| 2001/0050802 A1 | 12/2001 | Namiki et al. | |
| 2001/0050807 A1 | 12/2001 | Deguchi et al. | |

OTHER PUBLICATIONS

Masuda H. et al, "Ultra–wideband Optical Amplification with 3 dB bandwidth of 65 nm Using a Gain–Equalised Two Stage Erbium–doped Fibre Amplifier and Raman Amplification", Electronics Letters, IEEE Stevenage, GB, vol. 33, No. 9., Apr., 1997.

Hyo Sang Kim et al, "Actively Gain–Flattened Erbium-Doped Fiber Amplifier Over 35 NM By Using All–Fiber Acoustooptic Tunable Filters", IEEE Photonics Technology Letters, IEEE Inc. New York, US, vol. 10, No. 6, Jun., 1998.

S.J.B. Yoo, W. Xin, L.D. Garrett, J.C. Young, G. Ellinas, J.C. Chiao, M. Rauch, J. E. Baran, B. Meagher, H. Leblanc, G.K. Chang, "Observation of Prolonged Power Transients in a Reconfigurable Multiwavelength Network and their Suppression by Gain–Claimping of Optical Amplifiers", IEEE Photonics Technology Letters, vol. 10, No. 11, Nov. 1998.

P. Kim, S. Bae, S.J. Ahn, N. Park, "Analysis on the Channel Power Oscillation in the Closed WDM Ring Network with the Channel Power Equalizer", IEEE Photonics Technology Letters, vol. 12, No. 10, Oct. 2000.

I. Roudas, J.L. Jackel, D.H. Richards, N. Antoniades, J. E. Baran, "Transient Effects in Wavelength Add–Drop Multiplexer Chains", Optical Fiber Conference, OFC 1999.

*Primary Examiner*—Mark Hellner
(74) *Attorney, Agent, or Firm*—Harness, Dickey & Pierce, P.L.C.

(57) ABSTRACT

A method for dynamically compensating for signal loss and dispersion in an optical signal traversing though an optical network. The method includes providing a dynamic gain equalization filter (DGEQ) having a dynamically adjustable transfer function, and providing a first optical amplifier and a second optical amplifier interconnected by the DGEQ to form a dynamic amplifier site in the optical network. The method further includes controlling spectral power profile of the optical signal at an output of the dynamic amplifier site by dynamically adjusting a transfer function associated with the DGEQ.

23 Claims, 1 Drawing Sheet

DYNAMIC OPTICAL SPECTRAL CONTROL SCHEME FOR OPTICAL AMPLIFIER SITES

This is a continuation application of U.S. patent application Ser. No. 09/970,930 filed on Oct. 4, 2001 which has been abandoned.

FIELD OF THE INVENTION

The invention related generally to a method of dynamically compensating for signal loss and dispersion in an optical network and, more particularly, to a dynamic optical spectral control scheme for complex multiple device optical amplifier sites used in long haul, high capacity dense wavelength division multiplexing (DWDM) optical networks.

BACKGROUND OF THE INVENTION

Optical transmission impairments can be mitigated by using optical amplifier sites throughout an optical network, thereby achieving substantial optical performance enhancement, enabling longer system reach and higher network capacity. Accumulated loss and spectral ripple across wavelength channels can be compensated through a combination of optical amplifiers and optical filters, while accumulated dispersion can be compensated through periodically inserted dispersion compensation (DCM) units. For an optimized optical network transmission strategy, optimum optical signal to noise ratio (OSNR) is achieved by controlling the spectral power profile across wavelength channels launched into the optical fiber.

Although optical amplifier sites are complex network elements comprised of various optical devices, such as optical amplifiers, gain equalization filters, and DCM units, they do not typically employ dynamically adjustable optical devices. However, recently developed dynamic amplifier sites are beginning to incorporate dynamically adjustable optical devices.

Therefore, it is desirable to provide an improved optical control scheme for such dynamic optical amplifier sites. It is envisioned that the improved optical control scheme will enable steady state optimized optical network performance through a layered control strategy, distributed across multiple optical devices at the dynamic optical amplifier site. Distributed partitioning of the control objectives across individual optical devices will ensure optimized, flexible performance of the dynamic amplifier site. Functionally, optimization of the optical power spectrum shape launched from a dynamic amplifier site will be achieved via two levels of control: average power control achieved by variation of amplifier gain via pump laser control, and spectral power control to compensate for the spectral tilt and ripple via dynamic gain equalization and Raman control. This will enable compensation of the spectral tilt and ripple accumulated from a previous dynamic amplifier site, as well as compensation of slow varying perturbations like those due to polarization dependent loss (PDL) effects accumulated from various optical devices.

BRIEF SUMMARY OF THE INVENTION

In accordance with the present invention, a method is provided for dynamically compensating for signal loss and dispersion in an optical signal traversing though an optical network. The method includes providing a dynamic gain equalization filter (DGEQ) having a dynamically adjustable transfer function, and providing a first optical amplifier and a second optical amplifier interconnected by the DGEQ to form a dynamic amplifier site in the optical network. The method further includes controlling spectral power profile of the optical signal at an output of the dynamic amplifier site by dynamically adjusting a transfer function associated with the DGEQ.

In another aspect of the present invention, an alternative method is provided for dynamically compensating for signal loss and dispersion in an optical signal traversing though an optical network. The method includes providing a DGEQ having a dynamically adjustable transfer function, and providing a first optical amplifier and a second optical amplifier interconnected by the DGEQ to form a dynamic amplifier site in the optical network. The method further includes partitioning control objectives amongst the first optical amplifier, the second optical amplifier, and the DGEQ, thereby compensating for signal loss and dispersion in the optical signal.

For a more complete understanding of the invention, its objects and advantages, reference may be had to the following specification and to the accompanying drawings.

DETAILED DESCRIPTION OF THE INVENTION

Figure 1:
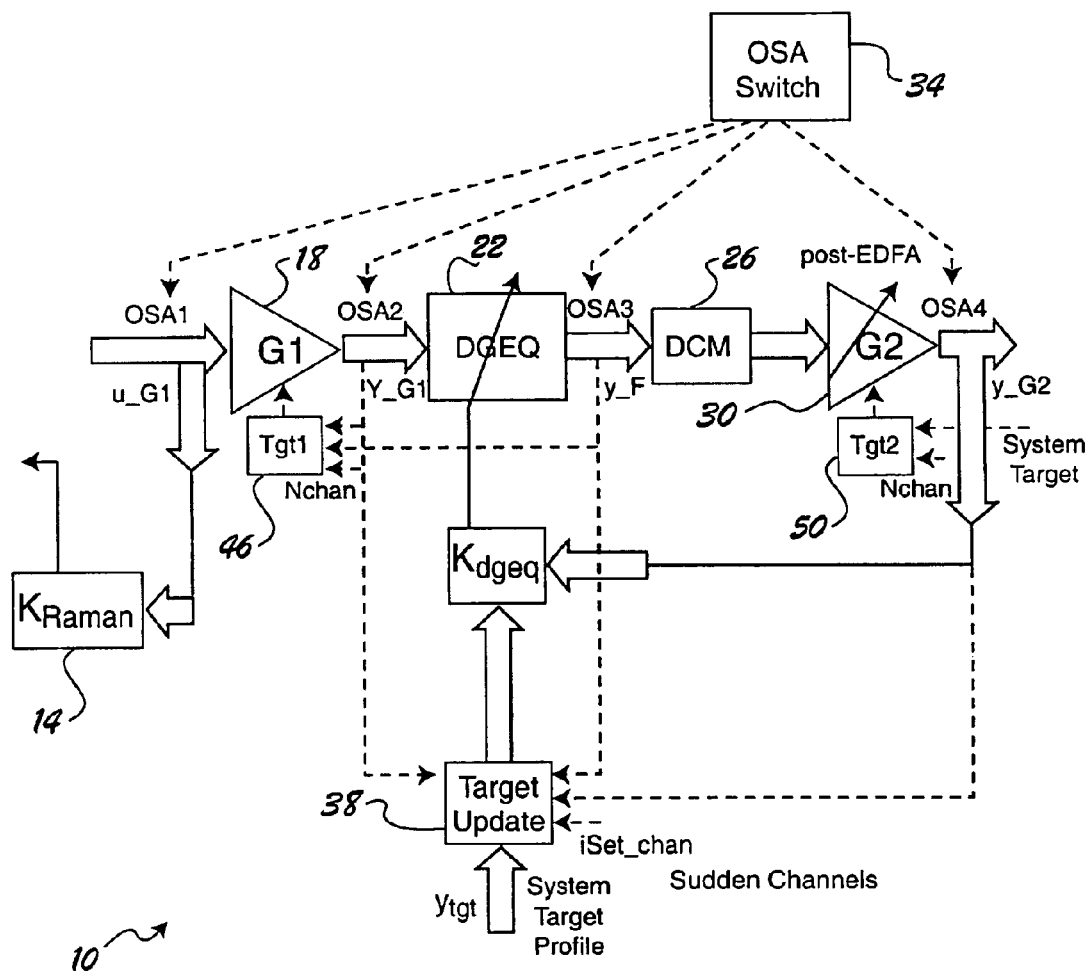
FIG. 1 is a schematic of a dynamic amplifier site in accordance with one embodiment of the present invention.

FIG. 1 is a schematic of a dynamic optical amplifier site 10 for providing optimized flexible steady state optical network performance. Optimal optical network transmissions are optical signal transmissions that have an optimum optical signal to noise ratio (OSNR). In an exemplary embodiment, amplifier site 10 maintains a certain target profile across wavelength channels by dynamically controlling the spectral power profile of a signal launched into an optical fiber, thereby providing an optical signal having an optimal OSNR. Additionally, amplifier site 10 ensures decoupling and proper dynamic functionality of all control loops, and robust stability with respect to changes in operating point. Furthermore, amplifier site 10 ensures robust handling of dynamic network configuration, for example adding and/or dropping wavelength channels or unexpected fiber cuts.

In the exemplary embodiment, amplifier site 10 includes a distributed Raman amplifier 14 that receives an optical signal from a preceding span of an optical network (not shown), in which amplifier site 10 is utilized. Raman amplifier 14 compensates for spectral tilt and ripple, and outputs a flattened optical signal to a first optical amplifier 18, such as an erbium-doped fiber amplifier (EDFA), herein referred to as a pre-EDFA 18. Pre-EDFA 18 receives the output signal from Raman amplifier 14, further attenuates the signal, and outputs the attenuated signal to a dynamic gain equalization filter (DGEQ) 22. DGEQ 22 further flattens the spectral profile of the signal and outputs the optical signal to a dispersion compensation unit (DCM) 26. DCM 26 compensates for dispersion in the signal and outputs the optical signal to a second optical amplifier 30, such as a second EDFA, referred to herein as post-EDFA 30. Post-EDFA 30 dynamically adjusts the total power of the signal and outputs, or launches, the signal into a subsequent span of the network such that the total power is maintained at a predetermined target level. The output of post-EDFA 30 is herein referred to as the system signal.

Pre-EDFA 18 maintains a total output power such that the input to DCM 26, or the output of DGEQ 22, is maximized and does not exceed a maximum allowable value per channel. DGEQ 22 provides spectral attenuation such that a target optical profile of the output signal of amplifier site 10, or the system optical signal, is achieved and maintained under various perturbations in the preceding span loss, input power levels, and channel loading.

Additionally, amplifier site 10 includes an optical spectral analysis unit (OSA) 34. OSA 34 measures optical power and spectral profile at various points in amplifier site 10. These measurements are used for various control loops that are used to dynamically control the individual components of amplifier site 10. A first target update module 38 dynamically controls the DGEQ. More specifically, the first target update module 38 assimilates information that includes OSA 34 measurements of the output of pre-EDFA 18, the output of DGEQ 22, and the system optical signal, and then uses this information to dynamically adjusts a transfer function associated with DGEQ 22, thereby controlling the output of DGEQ 22. A second target update module 46 dynamically controls the pre-EDFA 18. The second target update module 46 assimilates information that includes OSA 34 measurements of the output of pre-EDFA 18 and the output of DGEQ 22 and uses this information to dynamically adjust the gain associated with the pre-EDFA 18. Likewise, a third target update module 50 dynamically control the post-EDFA 30.

The overall objective of dynamic amplifier site 10 is to keep the power per channel at the predetermined flat level irrespective of perturbations such as span loss, variations in the imput power levels, sudden changes in the number of channels. In the exemplary embodiment, an optimization strategy assumes that for optimum OSNR, the power launched into the fiber, is to be the same, and fixed, for each channel, or wavelength. Both accumulated loss and ripple are compensated dynamically through a combination of amplifiers and filters, such as distributed Raman amplifier 14, DGEQ 22, and EDFA's 18 and 30, while the accumulated dispersion is compensated for by the DCM 26.

The exemplary embodiment uses a layered control strategy to achieve an optimum OSNR. A first level of control is a total power control Scheme and a second level of control is a spectral power control scheme. The total power control scheme assumes that a predetermined average power per channel is being launched into a subsequent span of optical fiber. The total power control scheme utilizes pre-EDFA 18 and post-EDFA 30 to control the total output power launched based on the channel count. Total power control is achieved through variation of the overall gain of amplifier site 10 based on the total power measurement by OSA 34.

On the other hand, the spectral power control scheme utilizes Raman amplifier 14 and DGEQ 22 to compensate for spectral tilt and ripple accumulated from the preceding optical span, and/or preceding dynamic amplifier site, based on individual channel power measurements obtained by OSA 34. The spectral power control scheme assumes decentralized control at each card, or component, such as Raman amplifier 14, pre-EDFA 18, DGEQ 22, and post-EDFA 30. Additionally, the spectral power control scheme assumes appropriate partitioning and propagation of control objectives, or targets, from the network element (NE) level to the card level.

Dynamic amplifier site 10 implements various control loops to control the individual components, or cards. A post-EDFA control loop is utilized to control post-EDFA 30 such that the total output power launched in the fiber is maintained at a target level. A pre-EDFA control loop is utilized to control pre-EDFA 18 such that the total power of the output of pre-EDFA 18 maximizes the input to DCM 26 and does not exceed a maximum allowable value per channel value. A DGEQ control loop is utilized to control DGEQ 22 such that the output spectrum at the output of the post-EDFA, or the system optical signal, is flat. Lastly, a Raman amplifier control loop is utilized to control Raman amplifier 14 such that input power to pre-EDFA 18 is flat.

The overall control strategy uses different control loop time constants to avoid errors caused by competing control loops. For example, the time constant of the post-EDFA control loop may be 100 ms, the time constant of the pre-EDFA may be on the order of 100 ms, the time constant of the DGEQ control loop may be on the order of 10 sec, and the time constant of Raman control loop may be on the order of 10–100 sec.

As described above, OSA 34 measures optical power levels at various point in amplifier site 10. For example, OSA 34 monitors power levels of the output of Raman amplifier 14, the output of pre-EDFA 18, the output of DGEQ 22, and the system optical signal. Furthermore, the control strategy monitors a DGEQ transfer function, all wavelength and channel occupancies, and channel OSNR's at the output of Raman amplifier 14, the output of pre-EDFA 18, the output of DGEQ 22, and the system optical signal.

To achieve an optimum OSNR in the system optical signal, the control scheme of amplifier site 10 has several objectives. These objectives include receiving system targets from the spectral power profile, propagating corresponding sub-targets to each of the components, or cards, after verifying that the sub-targets satisfy the system constraints. Each individual card achieves the corresponding sub-target individually and decentralized from the other cards, based on the control loop controlling the specific card, or component. Additional objectives of the control scheme are scheduling OSA 34 measurements and preprocessing the measurements, (eg. filtering and interpolation), determining system loading, or channel count, based on OSA 34 measurements, correlating these measurements with other information, such as global network information and transient control triggers, scheduling control loops, and maintaining stability of dynamic amplifier site 10.

As shown in FIG. 1, multiple loop interactions as well as localized, internal optical power constraints exist, therefore causing the behavior of the dynamic amplifier 10 to be nonlinear. Decoupling, proper functionality of the control loops, and providing stability to the overall system is achieved through layering of the time-constants, as well as though non-interacting control. Therefore, the objective of individual control loops are layered and set up to be non-competing with each other.

Each component, or card, of amplifier site 10 functions independently of the other components and has individual control objectives related specifically to each respective component. For instance, the pre-EDFA 18 may have a control objective to maintain a total output power such that the input power to DCM 26 is maximized and does not exceed a predetermined maximum allowable value per channel. In this case, actual target of pre-EDFA 18 total power will be changed by the control algorithm at the NE level depending on the spectral optical attenuation profile of DGEQ 22. Therefore, as seen in FIG. 1, there exists feedback coupling between the pre-EDFA control loop and the DGEQ control loop. To decouple these two loops, the DGEQ control loop has a very slow time response, such that target updates for pre-EDFA 18 are back propagated from the output of DGEQ 22 through a stationary spectral profile of DGEQ 22. Variations in the desired target values of pre-EDFA 18 from the NE level are in small incremental steps, within the allowable limits of the EDFA control loop for a smooth transition. Additionally, slow time response for DGEQ 22 ensures that changes in pre-EDFA 18 target are slowly varying, such that the pre-EDFA control loop can track the time response.

The target for pre-EDFA 18 is also changed at the NE level whenever there is new valid channel count information. Either the average power target per channel and channel count, or total power target will be given. Using this time-constant layering strategy, the pre-EDFA control loop will dominate over the DGEQ control loop, in the sense that in the absence of any other control loop, DGEQ 22 will flatten the optical signal to the average level imposed by pre-EDFA 18. An attenuation target for the DGEQ 22 below the average target level of pre-EDFA 18 could lead to undesirable behavior since pre-EDFA 18 counteracts DGEQ 22 action by continually increasing the gain of pre-EDFA 18, thereby effectively creating a moving target for DGEQ 22.

In contrast, the control objective of post-EDFA 30 is to maintain the total output power launched in the fiber at the output of post-EDFA 30 at a predetermined target level. The total output target for post-EDFA 30 will be changed at the NE level whenever there is new valid channel count information. Dynamic changes in the spectral profile of the output of DGEQ 22 lead to changes in the total power of the output of DCM 26, or the input to post-EDFA 30. The control loop for the post-EDFA 30 has to counteract these changes in total power input to post-EDFA 30 in order to maintain a constant total power in the system optical signal. Therefore, as with pre-EDFA 18, these changes have to be in small incremental steps and on a slower time-scale so that the post-EDFA control loop can track the changes. The pre-EDFA and post-EDFA control loops operate in tandem, on the same time-scale, to vary the overall total gain of the amplifier site 10 such that the total average output power is dynamically maintained at the desired target level. Therefore, slow changes in the input power, and/or changes in the DGEQ attenuation level, are compensated for within the EDFA response time.

The control objective for DGEQ 22 is to provide spectral attenuation such that the target optical power profile at the system optical signal is achieved and maintained under various perturbations in the span loss, input power levels, and channel loading. Since pre-EDFA 18 and post-EDFA 30 are operated at designed flat gain conditions, the effective objective of DGEQ 22 is to remove the residual spectral tilt and ripple after "coarse" attenuation and flattening is achieved by Raman amplifier 14. DGEQ 22 removes spectral tilt and ripple by monitoring the individual channel power levels of the system optical signal. The error between the actual power level measurements of the individual channels and the desired target profile is utilized in the DGEQ control loop to control attenuation of the signal spectral profile.

In one embodiment, the spectral profiles for pre-EDFA 18 and post-EDFA 30 are stationary, with DGEQ 22 compensating for the span loss and slow input power variations only. Therefore, the effective attenuation target of DGEQ 22 is slowly changing in relation to the control schemes for the pre-EDFA 18 and post-EDFA 30. Due to the shared nature of OSA 34 measurements, the time constant of the DGEQ control loop insert is slower than the time constant for the control loops of EDFA's 18 and 30. (eg., the DGEQ control loop is on the order of 10 seconds). This slower DGEQ control loop time constant decouples the DGEQ control loop from the EDFA control loops.

In operation, the total gains of EDFA's 18 and 30 are continuously changing on a much faster time scale than the DGEQ control loop. This has two consequences with respect to the DGEQ control loop. First, the pre-EDFA and post-EDFA control loops dominate with respect to the average or total power. Second, the effective attenuation target of DGEQ 22 changes on a faster time scale. Proper functionality of the DGEQ control loop requires that pre-EDFA 18 and post-EDFA 39 operate in tandem. In order to minimize the effect of combining the spectral gain variations of pre-EDFA 18 and post-EDFA 30 on the DGEQ control loop, the normalized error of the system optical signal measurement point is used in the DGEQ control loop. For example, the relative attenuation error of the system optical signal is back-propagated to DGEQ 22.

Since the DGEQ control loop operates with a varying EDFA spectral profile in the DGEQ control loop, a sufficiently low gain coefficient is selected to ensure convergence robustness. The attenuation target of DGEQ 22 is checked, or shifted, to be within an allowable range for the DGEQ 22. This shifting of the attenuation target for the DGEQ 22 counteracts the total gain variations in EDFA's 18 and 30. At each control iteration, the DGEQ control loop attenuates within allowable limits uniformly across the band, followed by a correction with respect to average, or total power of the system optical signal output by post-EDFA 30.

Validation of the attenuation target for DGEQ 22 involves both an incremental, as well as an absolute, target change. Incremental target change involves partitioning of the target space such that a smooth, slow transition in small incremental steps is achieved, with morphing between target profiles. Absolute target change involves verifying that the absolute attenuation desired satisfies the allowable limits of DGEQ 22, and is such that the power at the output of DGEQ 22 does not exceed the maximum limits for the input to DCM 26. This validation involves the spectral profile of DGEQ 22 determined by OSA 34 measurements at the output of pre-EDFA 18 and the output of DGEQ 22, or from its own internal state.

One skilled in the art will recognize that, channel loading is a parameter employed by the DGEQ control loop. For example, determination of which OSA 34 measurements are valid for existing optical channels. If invalid OSA 34 data is provided the DGEQ control loop will function improperly, resulting in potential instability in the case of long periods of undetected failures of OSA 34. In the case of missing channels, the control scheme of amplifier site 10 must inform the DGEQ control loop so that the corresponding OSA 34 data is ignored. Alternatively, in the case of sparsely populated systems, the control scheme can use interpolation across missing channels. The latter alternative may be beneficial for a transient response of DGEQ 22, for example, when there is uniform variation across the band when channels are added or dropped.

The Raman amplifier control loop does not have feedback coupling with other control loops, and is based on adjusting a plurality of pump powers such that the input to pre-EDFA 18 is maximized and flat. The Raman amplifier control loop has two modes. The first mode is a static control mode, in which the pump powers are controlled and maintained close to predetermined fixed nominal pump target values. Selection of these nominal pump targets is based on various tabulated values, depending on specific parameters, such as fiber type, span length, span attenuation profile, channel loading etc. The second mode is a dynamic control mode, in which OSA 34 utilizes individual channel power measurements at pre-EDFA 18 input. Based on the channel power measurements, the pump target values are adjusted around the respective pump nominal values, such that the error between OSA 34 measurements and the desired target per channel is minimized.

Slow response time in the Raman dynamic control mode implies that the variations in the DGEQ target due to contribution by Raman amplifier 14 will be slowly changing. In this way, Raman amplifier 14 will achieve an effective "coarse" flattening, with DGEQ 22 providing the "finer" attenuation. The effective time constant of Raman amplifier 14 control will be approximately 10–100 sec.

As with DGEQ 22, validation of the incremental target changes, as well as of the absolute pump target values, may be required. This can be done either on the Raman card or at the NE level. With respect to the spectral measurements, validation of OSA 34 measurements as well as channel loading are needed. In the case of sparsely populated systems, interpolation across missing channels may be used.

OSA 34 is the measurement device for maintaining flat power, or other desired spectral profiles, as well as for measuring OSNR spectra. Depending on the measurements point, different processing might be required on the OSA card. For example, OSA 34 may perform filtering when required for some slow control loops, such as the DGEQ control loop, or OSA 34 may determine which channels are present at OSA 34, or OSA 34 may correlate OSA 34 information with other types of information, such as global network information.

As described above, OSA 34 measurements at various points are used for various control loops. Therefore, OSA 34 is time-multiplexed through the use of an 8×1 OSA switch. The strategy for the OSA switch takes into account proper functionality of the control loops as well as reducing the number of switches, thereby increasing the life expectancy of the OSA switch. The OSA switch multiplexing effectively decimates or down-samples OSA 34 measurements so that some extra digital low pass filtering may be required before the slow control loops, such as the DGEQ and Raman control loops, are triggered.

In the exemplary embodiment, OSA 34 operates under a plurality of constraints. One such constraint is that the DGEQ control loop uses OSA 34 measurements of the system optical signal at the output of the site 10 for the error signal, which is triggered by a valid measurement. Another constraint is that DGEQ 22 needs current updated measurements at the output of pre-EDFA 18 and the output of DGEQ 22 to determine the current attenuation profile. Yet another constraint is that updated measurements at the output of pre-EDFA 18 and the output of DGEQ 22 will trigger change in the target for the pre-EDFA amplifier control loop. Still yet another constraint is that an updated measurement at the output of Raman amplifier 14 will trigger one iteration of the Raman dynamic control loop.

Under stationary conditions, the DGEQ control loop is the dynamic element that triggers the pre-EDFA and the post-EDFA control loops. Under normal operation, the OSA switch will cycle in a round-robin fashion from measurement of the output of Raman amplifier 14 to measurement of the system optical signal in clock-wise direction, with some of the points requiring potentially more than one measurement data for filtering, for example, of the system optical signal at the output of the site 10. If the cumulated error of the system optical signal at the output of the site 10 is above a predetermined threshold, the DGEQ control loop iteration is triggered followed by another OSA switch cycle from the output of Raman amplifier 14. Otherwise, continuous measurements of the system optical signal at the output of the site 10 will be taken until the cumulated error exceeds this threshold, or until a change in the channel loading is detected. When the power level of the system optical signal at the output of the site 10 exceeds the threshold or a change in channel loading is detected, the cycle will be resumed from the output of Raman amplifier 14, such that updated measurements at all measured outputs are provided for the DGEQ control loop.

Although amplifier site 10, shown in FIG. 1 and described above, is presently preferred, it is envisioned that other amplifier site configurations are also within the scope of the present invention. For example, one skilled in the art would readily recognize that if the Raman amplifier were removed from amplifier site 10, the modified amplifier site would also be within the present invention. In such an amplifier site, the DGEQ would dynamically attenuate spectral tilt and ripple without the prior signal flattening of a Raman amplifier. Furthermore, one skilled in the art would readily recognize that if the Raman amplifier and the pre-EDFA were removed from amplifier site 10, such a modified amplifier site would also be within the scope of the present invention. In this case the amplifier site would utilize the DGEQ to dynamically attenuate spectral tilt and ripple without the prior signal flattening of a Raman amplifier, and dynamically adjust the power of the amplifier site output signal using only one optical amplifier.

While the invention has been described in its presently preferred form, it will be understood that the invention is capable of modification without departing from the spirit of the invention as set forth in the appended claims.

What is claimed is:

1. A method of dynamically compensating for signal loss and dispersion in an optical signal traversing though an optical network; comprising:

providing a dynamic gain equalization filter (DGEQ) having a dynamically adjustable transfer function;

providing a first optical amplifier and a second optical amplifier interconnected by the DGEQ to form a dynamic amplifier site in the optical network; and controlling spectral power profile of the optical signal at an output of the dynamic amplifier site by dynamically adjusting a transfer function associated with the DGEQ;

controlling average power of the optical signal by dynamically adjusting gains of the first optical amplifier and the second optical amplifier; and decoupling a first optical amplifier control loop, a DGEQ control loop, and a second optical amplifier control loop, respectively utilized to control outputs of the first optical amplifier, the DGEQ, and the second optical amplifier.

2. The method in accordance with claim 1, wherein controlling the spectral power profile comprises utilizing the DGEQ control loop to dynamically adjust the transfer function of the DGEQ, thereby controlling a DGEQ output such that the optical signal at the output of the amplifier site is flat and has a target optical power profile.

3. The method in accordance with claim 1, wherein controlling average power of the optical signal comprises utilizing the first optical amplifier control loop to control a first optical amplifier output such that the power level of an output of the DGEQ is maximized and does not exceed a maximum allowable value per channel.

4. The method in accordance with claim 1 wherein controlling average power of the optical signal comprises utilizing the second optical amplifier control loop to control the second optical amplifier, thereby dynamically adjusting the total output power of the optical signal such that the optical signal at the output of the amplifier site has an optimum signal to noise ratio.

5. The method in accordance with claim 1 wherein decoupling comprises layering time-constants of the first optical amplifier control loop, the DGEQ control loop, and the second optical amplifier control loop, such that respective frequencies of the first optical amplifier control loop, the DGEQ control loop, and the second optical amplifier control loop are not competing.

6. A method of dynamically compensating for signal loss and dispersion in an optical signal traversing though an optical network; comprising:

providing a dynamic gain equalization filter (DGEQ) having a dynamically adjustable transfer function;

providing a first optical amplifier and a second optical amplifier interconnected by the DGEQ to form a dynamic amplifier site in the optical network; and partitioning control objectives amongst the first optical amplifier, the second optical amplifier, and the DGEQ, thereby compensating for signal loss and dispersion in the optical signal.

7. The method in accordance with claim 6 wherein partitioning control objectives comprises:

controlling average power of the optical signal by dynamically adjusting a gain of the first optical amplifier and a gain of the second amplifier; and controlling spectral power profile of the optical signal by dynamically adjusting the transfer function of the DGEQ.

8. The method in accordance with claim 7 wherein controlling average power of the optical signal comprises utilizing a first optical amplifier control loop to control the first optical amplifier, thereby maintaining the power level of an output of the first optical amplifier such that the power level of an output of the DGEQ is maximized and does not exceed a maximum allowable value per channel.

9. The method in accordance with claim 7 wherein controlling average power of the optical signal comprises utilizing a second optical amplifier control loop to control the second optical amplifier, thereby dynamically adjusting the total output power of the optical signal such that the optical signal has an optimum signal to noise ratio at an output of the amplifier site.

10. The method in accordance with claim 7 wherein controlling the spectral power profile comprises utilizing a DGEQ control loop to dynamically adjust the DGEQ transfer function, thereby controlling the DGEQ such that the optical signal at an output of the amplifier site is flat and has a target optical power profile.

11. The method in accordance with claim 6 further comprising decoupling a first optical amplifier control loop, a DGEQ control loop, and a second optical amplifier control loop, respectively utilized to control outputs of the first optical amplifier, the DGEQ, and the second optical amplifier.

12. The method in accordance with claim 11 wherein decoupling comprises layering time-constants of the first optical amplifier control loop, the DGEQ control loop, and the second optical amplifier control loop such that respective frequencies of the first optical amplifier control loop, the DGEQ control loop, and the second optical amplifier control loop are not competing.

13. A dynamic optical amplifier system, comprising:

a dynamic gain equalizer (DGEQ) filter configured to receive an optical signal and operable to adjust a spectral power profile of the optical signal;

at least one optical amplifier connected to said DGEQ filter and operable to adjust optical power level of the optical signal; and an optical spectral analysis (OSA) unit configured to measure spectral power profile of the optical signal at a plurality of measurement points in said system, wherein the measurements are utilized in at least one optical amplifier control loop and a DGEQ control loop.

14. The system in accordance with claim 13 wherein said optical amplifier configured to utilized said optical amplifier control loop to dynamically adjust the total output power of the optical signal such that the optical signal has an optimum signal to noise ratio at the output of said amplifier system.

15. The system in accordance with claim 13 wherein said DGEQ further configured to utilize said DGEQ control loop to dynamically adjust a transfer function associated with said DGEQ, thereby controlling the spectral power profile of the optical signal at the output of said system.

16. The system in accordance with claim 13 wherein said system further comprises a distributed Raman amplifier configured to further adjust the spectral profile of the optical signal by removing spectral tilt and ripple from the optical signal prior to the signal being input to said DGEQ.

17. The system in accordance with claim 13 wherein said system further configured to decouple said at least one optical amplifier control loop and said DGEQ control loop by layering time-constants of said at least one optical amplifier control loop and said DGEQ control loop.

18. A system for achieving an optimum signal to noise ratio (OSNR) in a optical signal launched into an optical fiber by dynamically compensating for signal loss and dispersion in said optical signal using a layered control strategy, said system comprising:

a first and a second erbium-doped fiber amplifier (EDFA) configured to dynamically adjust a total output power of the optical signal;

a distributed Raman amplifier configured to dynamically adjust the spectral profile of the optical signal, and output the adjusted signal to said first EDFA; and a dynamic gain equalization filter (DGEQ) interconnected between said first EDFA and said second EDFA, said DGEQ configured to further adjust the spectral profile of the optical signal.

19. The system in accordance with claim 18 wherein said system further comprises an optical spectral analysis unit (OSA) configured to monitor spectral measurements at a plurality of measurement points in said system, wherein the measurements are utilized in at least one of a first EDFA control loop, a DGEQ control loop, and a second EDFA control loop.

20. The system in accordance with claim 19 wherein said first EDFA further configured to utilize said first EDFA control loop to maintain a power level of the optical signal at the output of said first EDFA, such that a power level of the optical signal at the output of said DGEQ is maximized and does not exceed a maximum allowable value per channel.

21. The system in accordance with claim 19 wherein said DGEQ further configured to remove residual spectral tilt and ripple from the optical signal by utilizing said DGEQ control loop to dynamically adjusting a transfer function associated with said DGEQ such that the optical spectrum of the optical signal at the output of said system is flat and has a target optical power profile.

22. A system in accordance with claim 19 wherein said system further configured to decouple said first EDFA control loop, said DGEQ control loop, and said second EDFA control loop by layering time-constants of said first EDFA control loop, said DGEQ control loop, and said second EDFA control loop.

23. A method of dynamically compensating for signal loss and dispersion in an optical signal traversing though an optical network; comprising:

providing a dynamic gain equalization filter (DGEQ) having a dynamically adjustable transfer function;

providing a first optical amplifier and a second optical amplifier interconnected by the DGEQ to form a dynamic amplifier site in the optical network; and controlling spectral power profile of the optical signal at an output of the dynamic amplifier site by dynamically adjusting a transfer function associated with the DGEQ, wherein controlling the spectral power profile further includes providing a Raman amplifier connected to an input of the first optical amplifier operable to remove spectral tilt and ripple from the optical signal such that an output of the Raman amplifier is maximized and flattened.

* * * * *